United States Patent [19]

Angevine et al.

[11] 4,404,097

[45] Sep. 13, 1983

[54] RESIDUA DEMETALATION/DESULFURIZATION CATALYST AND METHODS FOR ITS USE

[75] Inventors: Philip J. Angevine, West Deptford; Stephen M. Oleck, Moorestown, both of N.J.

[73] Assignee: Mobil Oil Corporation, New York, N.Y.

[21] Appl. No.: 303,335

[22] Filed: Sep. 18, 1981

Related U.S. Application Data

[62] Division of Ser. No. 187,685, Sep. 16, 1980, Pat. No. 4,328,127.

[51] Int. Cl.³ .............................................. C10G 45/04

[52] U.S. Cl. .............................. 208/210; 208/216 PP; 208/251 H

[58] Field of Search ............. 208/216 PP, 251 H, 210

[56] References Cited

U.S. PATENT DOCUMENTS

| | | | |
|---|---|---|---|
| 3,891,541 | 6/1975 | Oleck et al. | 208/89 |
| 4,016,067 | 4/1977 | Fischer et al. | 208/89 |
| 4,054,508 | 10/1977 | Milstein et al. | 208/89 |
| 4,082,695 | 4/1978 | Rosinski et al. | 252/465 |
| 4,267,033 | 5/1981 | Heck et al. | 208/216 PP |
| 4,328,127 | 5/1982 | Angevine et al. | 252/439 |

*Primary Examiner*—Delbert E. Gantz
*Assistant Examiner*—O. Chaudhuri
*Attorney, Agent, or Firm*—Akexander J. McKillop; Michael G. Gilman; Charles J. Speciale

[57] ABSTRACT

A new CoMo/alumina catalyst of improved stability and activity for demetalation/desulfurization of residual oil fractions having about 40 to 75% of its pore volume in 150–200 A diameter pores and up to about 5% of its pore volume in 500 A+ diameter pores.

6 Claims, 2 Drawing Figures

CATALYST PORE SIZE DISTRIBUTIONS
○ - CATALYST - A
△ - CATALYST - B
▽ - CATALYST - C
TOTAL PORE VOLUME, CC/G
.5
.4
.3
.2
.1
0
25
50
100
250
500
1000
2500
5000
PORE DIAMETER, ANGSTROMS

RESIDUA DEMETALATION/DESULFURIZATION CATALYST AND METHODS FOR ITS USE

This is a division of copending application Ser. No. 187,685, filed Sept. 16, 1980, U.S. Pat. No. 4,328,127.

BACKGROUND OF THE INVENTION

1. Field of the Invention

This invention is concerned with an improved catalytic process for the demetalation and desulfurization of petroleum oils, preferably those residual fractions with undesirably high metals and/or sulfur contents. More particularly, the invention utilizes a demetalation-desulfurization catalyst characterized by novel specifications including pore size distribution, said catalyst comprising a Group VI A metal and an iron group metal composited with a Delta and/or Theta phase alumina, said catalyst having a specific pore size distribution, and other specific characteristics described hereinbelow.

2. Description of the Prior Art

Residual petroleum oil fractions produced by atmospheric or vacuum distillation of crude petroleum are characterized by relatively high metals and sulfur content. This comes about because practically all of the metals present in the original crude remain in the residual fraction, and a disproportionate amount of sulfur in the original crude oil also remains in that fraction. Principal metal contaminates are nickel and vanadium, with iron and small amounts of copper also sometimes present. Additionally, trace amounts of zinc and sodium are found in some feedstocks. The high metals content of the residual fractions generally preclude their effective use as charge stocks for subsequent catalyst processing such as catalytic cracking and hydrocracking. This is so because the metal contaminants deposit on the special catalysts for these processes and cause the premature aging of the catalyst and/or formation of inordinate amounts of coke, dry gas and hydrogen.

It is current practice to upgrade certain residual fractions by a pyrolytic operation known as coking. In this operation the residuum is destructively distilled to produce distillates of low metals content and leave behind a solid coke fraction that contains most of the metals. Coking is typically carried out in a reactor or drum operated at about 800° to 1100° F. temperature and a pressure of one to ten atmospheres. The economic value of of the coke by-product is determined by its quality, especially its sulfur and metals content. Excessively high levels of these contaminants make the coke useful only as low-valued fuel. In contrast, cokes of low metals content, for example up to about 100 ppm (parts-per-million by weight) of nickel and vanadium, and containing less than about 2 weight percent sulfur may be used in high valued metallurgical, electrical and mechanical applications.

Certain residual fractions are currently subjected to visbreaking, which is a heat treatment of milder conditions than used in coking, in order to reduce their viscosity and make them more suitable as fuels. Again, excessive sulfur content sometimes limits the value of the product.

Residual fractions are sometimes used directly as fuels. For this use, a high sulfur content in many cases is unacceptable for ecological reasons.

At present, catalytic cracking is generally done utilizing hydrocarbon chargestocks lighter than residual fractions which generally have an API gravity less than 20. Typical cracking chargestocks are coker and/or crude unit gas oils, vacuum tower overhead, etc., the feedstock having an API gravity from about 15 to about 45. Since those cracking chargestocks are distillates, they do not contain significant proportions of the large molecules in which the metals are concentrated. Such cracking is commonly carried out in a reactor operated at a temperature of about 800° to 1500° F., a pressure of about 1 to 5 atmospheres, and a space velocity of about 1 to 1000 WHSV.

The amount of metals present in a given hydrocarbon stream is often expressed as a chargestock's "metals factor." This factor is equal to the sum of the metals concentrations, in parts per million, of iron and vanadium plus ten times the concentration of nickel and copper in parts per million, and is expressed in equation form as follows:

$$F_m = Fe + V + 10(Ni + Cu)$$

Conventionally, a chargestock having a metals factor of 2.5 or less is considered particularly suitable for catalytic cracking. Nonetheless, streams with a metals factor of 2.5 to 25, or even 2.5 to 50, may be used to blend with or as all of the feestock to a catalytic cracker, since chargestocks with metals factors greater than 2.5 in some circumstances may be used to advantage, for instance with the newer fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably at least 90% needs to be removed to produce fractions (having a metals factor of about 2.5 to 50) suitable for cracking chargestocks.

Metals and sulfur contaminants would present similar problems with regard to hydrocracking operations which are typically carried out on chargestocks even lighter than those charged to a cracking unit. Typical hydrocracking reactor conditions consist of a temperature of 400° to 1000° F. and a pressure of 100 to 3500 psig.

It is evident that there is considerable need for an efficient method to reduce the metals and/or sulfur content of petroleum oils, and particularly of residual fractions of these oils. While the technology to accomplish this for distillate fractions has been advanced considerably, attempts to apply this technology to residual fractions generally fail due to very rapid deactivation of the catalyst, presumably by metals contaminants.

Hydrotreatment catalysts having specified pore distributions have been proposed to overcome disadvantages encountered when using conventional prior art catalysts for the hydrotreatment of petroleum residua or other metals and sulfur-containing, heavy hydrocarbons.

Rosinski (U.S. Pat. No.4,082,695) discloses a hydrodemetalation-desulfurization class of catalysts comprising a hydrogenating component (e.g., cobalt and molybdenum) composited with a particular refractory base comprising theta or delta phase alumina. The composite catalyst of Rosinski has a surface area of about 40–150 square meters per gram ($m^2/g$) and has the following pore size distribution: not less than 60% of the total pore volume have a diameter within the range of about 100–200 Angstroms (A), not less than about 5% of the total pore volume are greater than 500 A in diameter. The preferred catalyst has a surface area of 110 $m^2/g$ or less and not less than 5% of the total pore volume are less than about 40 A in diameter. The efficiency of the catalyst is principally a result of the high concentration or pores within the 100–200 A range although the largest pores (greater than about 500 A) are said to be required for conversion of exceptionally large heteroatomic molecules and the smallest pores (less than about 40 A) are though to enhance sulfur removal generally. The distinct pore size distribution of the catalyst is believed to be due, at least in part, to the calcination of the alumina catalyst base during preparation to produce a specific alumina comprising theta or delta phase alumina.

U.S. Pat. Nos. 3,876,523; 4,016,067; and 4,054,508 disclose processes for the demetalation and desulfurization of residua which employ the Rosinski catalyst. The '523 patent discloses and claims this use of the catalyst generally. The '067 patent discloses a dual catalyst system wherein the Rosinski catalyst in the first "demetalation" catalyst and a high surface area, smaller pore catalyst is the second, "desulfurization" catalyst. The '508 patent discloses a three-zone, dual catalyst process which is analogous to the '067 process except that there is an additional, third zone containing a relatively smaller bed of the first zone catalyst disclosed by Rosinski.

U.S. Pat. Nos. 4,048,060 and 4,069,139 disclose an alumina-containing hydrotreating catalyst having a mean pore radius of about 70 to 95 A, a total pore volume between 0.45 and 1.50 milliliters per gram (ml/g), a total surface area between 130 and 500 $m^2/g$, and the following pore size distribution: less than 0.05 ml of pore volume/g have radii greater than 100 A, at least 0.40 ml of pore volume/g have radii in the range of the mean pore radius $\pm 10$ A, at least 75% of the total pore volume have radii in the range of the mean pore radius $\pm 10$ A, and less than 0.05 ml of pore volume/g have radii below 60 A. The method of preparing this hydrotreating catalyst and its alumina support are "conventional." U.S. Pat. No. 4,048,060 at col. 6, lines 30–36 and U.S. Pat. No. 4,069,139 at col. 4, lines 55–60. "Conventional" alumina supports comprise gamma alumina and catalysts prepared from such supports do not have the advantageous properties of catalysts such as those of Rosinski, supra, to which the catalysts of the present invention are related.

Other less relevant patents in this general area are: Anderson (U.S. Pat. No. 2,890,162), Erickson (U.S. Pat. No. 3,242,101), Bertolacini (U.S. Pat. No. 3,393,148), Cornelius (U.S. Pat. No. 3,669,904), Roseline (U.S. Pat. No. 3,684,688), Bertolacini (U.S. Pat. No. 3,714,032), Christman (U.S. Pat. No. 3,730,879), Wilson (U.S. Pat. No. 3,898,155), Oleck (U.S. Pat. No. 3,931,052), Hamner (U.S. Pat. No. 4,014,821), and Oleck (U.S. Pat. No. 4,089,774).

SUMMARY OF THE INVENTION

It has now been found that hydrocarbon oils containing both metals and sulfur contaminants may be very effectively demetalized and desulfurized by contact under hydrotreating conditions with hydrogen and a catalyst comprising a hydrogenation component composited with an alumina support, said composite catalyst having a particular pore size distribution. In particular about 40 to 75% of the total pore volume is contained in pores having a diameter within the range from about 150–200 A and up to 5%, preferably from 1 to 5%, of the total pore volume is contained in pores having a diameter greater than about 500 A. The catalyst may additionally be characterized as having a surface area of about 90 to 130 $m^2/g$ and a total pore volume of about 0.35 to 0.75 cc/g. The catalyst also has high-temperature delta and/or theta phases of alumina present.

For best results in the process of this invention, the catalyst should have a total pore volume of 0.4 to 0.65 cc/g and have about 40 to 75% of its pore volume in pores greater than 150 A up to 200 A diameter and up to about 5% of its pore volume in pores greater than 500 A diameter.

The pore volumes referred to herein, with the exception of pores less than 30 A diameter, are those volumes determined by mercury porosimeter using techniques well known to those skilled in the art of catalyst preparation. Pore volume in pores less than 30 A is determined by subtracting the pore volume accessible to mercury from the total pore volume determined independently.

Under the reaction conditions hereinafter to be described, the specified catalyst exhibits improved activity and stability over known catalysts, particularly over the related Rosinski catalyst, described supra. The present catalyst, which is prepared by the same general method as that disclosed by Rosinski (U.S. Pat. No. 4,082,695), differs therefrom primarily by a decreased macropore volume (volume of pores having a diameter greater than 500 A) and an increased concentration of 150–200 A diameter pores.

DETAILED DESCRIPTION OF THE INVENTION

Figure 1:
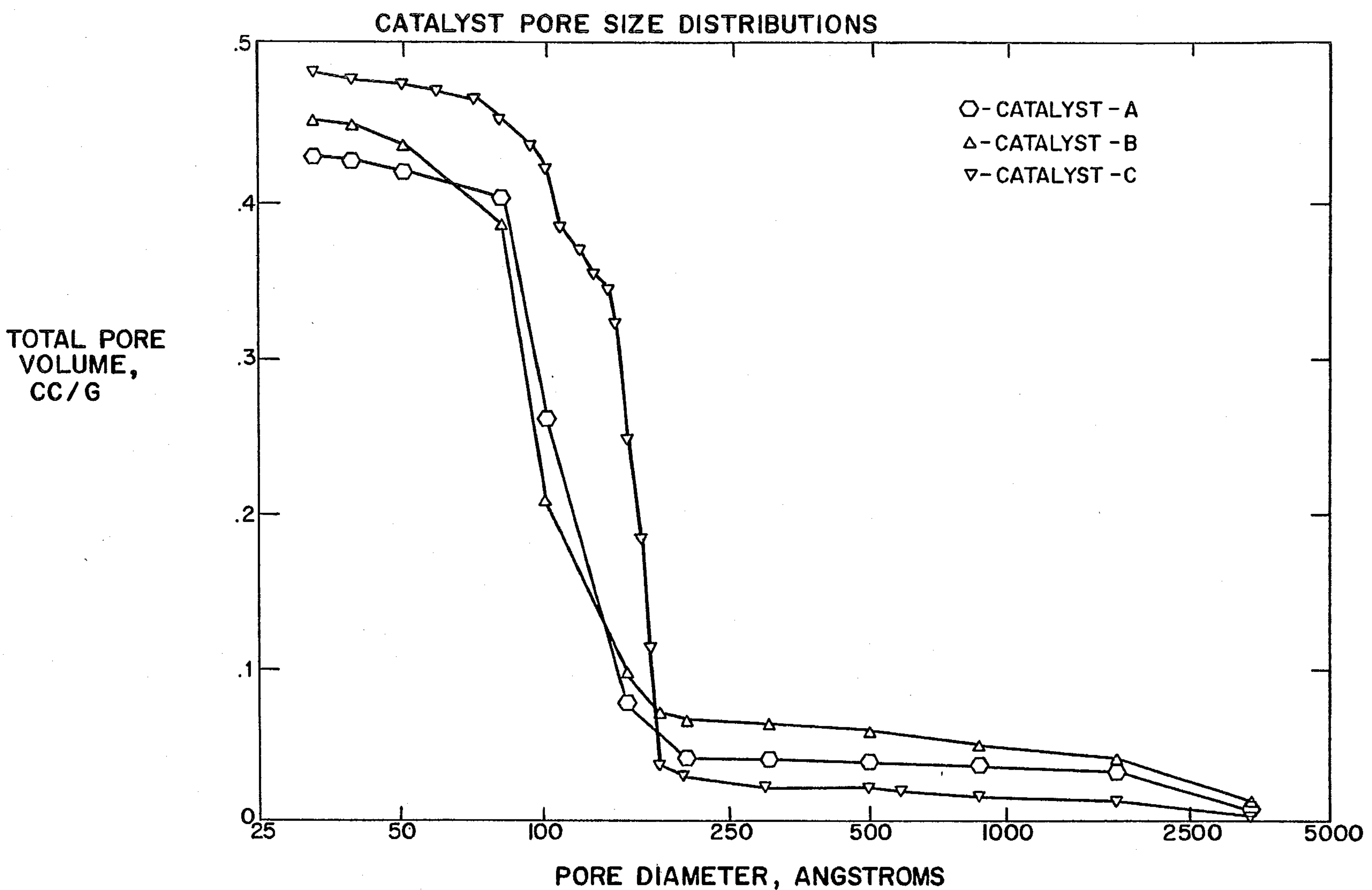
FIG. 1 is a set of pore size distribution curves showing the pore size distribution of a catalyst of the present invention and those of some related catalysts of the type disclosed by Rosinski.

The hydrocarbon feed to the process of this invention can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling above 650° F. and containing a substantial quantity of asphaltic materials. Thus, the chargestock can be one having an initial or 5 percent boiling point somewhat below 650° F., provided that a substantial proportion, for example, about 70 or 80 percent by volume, of its hydrocarbon components boil above 650° F. A hydrocarbon stock having a 50 percent boiling point of about 900° F. and which contains asphaltic materials, 4% by weight sulfur and 51 ppm nickel and vanadium is illustrative of such chargestock. Typical process conditions may be defined as contacting a metal and/or sulfur contaminant containing chargestock with this invention's catalyst under a hydrogen pressure of about 500 to 3000 psig at 600° to 850° F. temperature, and 0.1 to 5 LHSV (i.e., 0.1 to 5 volumes of chargestock per volume of catalyst per hour).

The hydrogen gas which is used during the hydrodemetalation-hydrodesulfurization is circulated at a rate between about 1,000 and 15,000 s.c.f./bbl. of feed and preferably between about 3,000 and 8,000 s.c.f./bbl. The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. The recycled gas is usually washed with a chemical absorbent for hydrogen sulfide or otherwise treated in known manner to reduce the hydrogen sulfide content thereof prior to recycling.

For the purpose of this invention, it is preferred to operate with catalyst particles such as 1/32 inch extrudate or the equivalent disposed in one or more fixed beds. Furthermore, the catalyst described herein may be effectively used as the sole catalyst in the process of this invention. Alternatively, a dual bed arrangement such as described in U.S. Pat. No. 4,016,067 issued Apr. 5, 1977, or a dual catalyst, three bed arrangement such as described in U.S. Pat. No. 4,054,508 issued Oct. 18, 1977, may be used. The entirety of both of these patents is incorporated into this specification by reference. The catalyst of this invention may advantageously be substituted for the "1st catalyst" disclosed in the '067 patent and for the catalyst of the 1st and 3rd zones of the '058 patent. The catalyst may be presulfided, if desired, by any of the techniques known to those skilled in the art.

The hydrogenating component of the class of catalysts disclosed herein can be any material or combination thereof that is effective to hydrogenate and desulfurize the chargestock under the reaction conditions utilized. For example, the hydrogenating component can be at least one member of the group consisting of Group VI and Group VIII metals in a form capable of promoting hydrogenation reaction, especially effective catalysts for the purposes of this invention are those comprising molybdenum and at least one member of the iron group metals. Preferred catalysts of this class are those containing about 2 to about 10 percent by weight cobalt and about 5 to about 20 percent by weight molybdenum, but other combinations of iron group metals and molybdenum such as iron, nickel and molybdenum, as well as combinations of nickel and molybdenum, cobalt and molybdenum, nickel and tungsten or other Group VI or Group VIII metals of the Periodic Table taken singly or in combination. The hydrogenating components of the catalysts of this invention can be employed in sulfided or unsulfided form.

When the use of a catalyst in sulfided form is desired, the catalyst can be presulfided, after calcination, or calcination and reduction, prior to contact with the chargestock, by contact with a sulfiding mixture of hydrogen and hydrogen sulfide, at a temperature in the range of about 400° to 800° F., at atmospheric or elevated pressures. Presulfiding can be conveniently effected at the beginning of an onstream period at the same conditions to be employed at the start of such period. The exact proportions of hydrogen and hydrogen sulfide are not critical, and mixtures containing low or high proportions of hydrogen sulfide can be used. Relatively low proportions are preferred for economic reasons. When the unused hydrogen and hydrogen sulfide utilized in the presulfiding operation is recycled through the catalyst bed, any water formed during presulfiding is preferably removed prior to recycling through the catalyst bed. It will be understood that elemental sulfur or sulfur compounds, e.g., mercaptans, or carbon desulfide that are capable of yielding hydrogen sulfide at the sulfiding conditions, can be used in lieu of hydrogen sulfide.

Although presulfiding of the catalyst is preferred, it is emphasized that this is not essential as the catalyst will normally become sulfided in a very short time by contact, at the process conditions disclosed herein, with the high sulfur content feedstocks to be used.

When compared with prior art catalysts such as those of U.S. Pat. Nos. 4,069,139 and 4,048,060, the uniqueness of the catalyst of this invention is believed to be due to the fact that the alumina base catalyst is calcined to a particular temperature, thereby producing a specific alumina comprising theta or delta phase alumina. These phases are believed to produce the distinct pore size distribution of the catalyst. When compared with the catalysts disclosed by U.S. Pat. No. 4,082,695, the uniqueness of the catalyst of this invention is due to the higher concentration of pores in the 150-200 A diameter range and the lower concentration of pores in the 500 A+ diameter range. Table I below shows a comparison of the properties of catalyst of this invention (SMO 9141) with the properties of catalysts disclosed in the '695 patent.

TABLE I

| | | Properties of Resid Hydroprocessing Catalysts | | |
|---|---|---|---|---|
| | | A SMO-8066 | B SMO-8410 | C SMO-9141 |
| Chemical Composition, Wt. Pct. | | | | |
| Cobaltous Oxide | | 3.4 | 3.3 | 3.7 |
| Molybdena | | 10.6 | 9.9 | 9.6 |
| Alumina | | Balance | Balance | Balance |
| Physical Properties | | | | |
| Surface Area, Sq. M/G | | 104 | 112 | 112 |
| Real Density, G/CC | | 3.64 | 3.44 | 3.69 |
| Particle Density, G/CC | | 1.31 | 1.25 | 1.27 |
| Pore Volume, CC/G | | 0.490 | 0.509 | 0.516 |
| Pore Size Distribution, CC/G | | | | |
| 0/30 | Angstroms | 0.056 | 0.053 | 0.030 |
| 30/50 | Angstroms | 0.006 | 0.006 | 0.008 |
| 50/80 | Angstroms | 0.007 | 0.012 | 0.012 |
| 80/100 | Angstroms | 0.017 | 0.049 | 0.029 |
| 100/150 | Angstroms | 0.139 | 0.177 | 0.116 |
| 150/200 | Angstroms | 0.176 | 0.137 | 0.281 |
| 200/300 | Angstroms | 0.047 | 0.008 | 0.010 |
| 300/500 | Angstroms | 0.002 | 0.003 | 0.008 |
| 500+ | Angstroms | 0.040 | 0.064 | 0.022 |

The unique pore size distribution of the invention catalyst C in Table I in comparison with prior art catalysts A and B in Table I is further graphically illustrated by FIG. 1. A particular method of preparing this catalyst is explained in detail in Example 17.

As noted in Alumina Properties, p. 46 by Newsome, Heiser, Russel and Stumpf (Alcoa Research Laboratories 1960), the theta alumina phase may only be reached through employing an alpha monohydrate or a beta trihydrate alumina form. Calcining temperatures required to achieve the theta phase vary depending on which alumina form is utilized as the initial alumina. An alpha monohydrate enters the gamma phase at about 500° C., crosses the transition point into the delta phase at about 860° C. and enters the narrowly temperature banded theta phase at about 1050° C. The transition point between theta and alpha phases being at about 1150° C.

Figure 2:
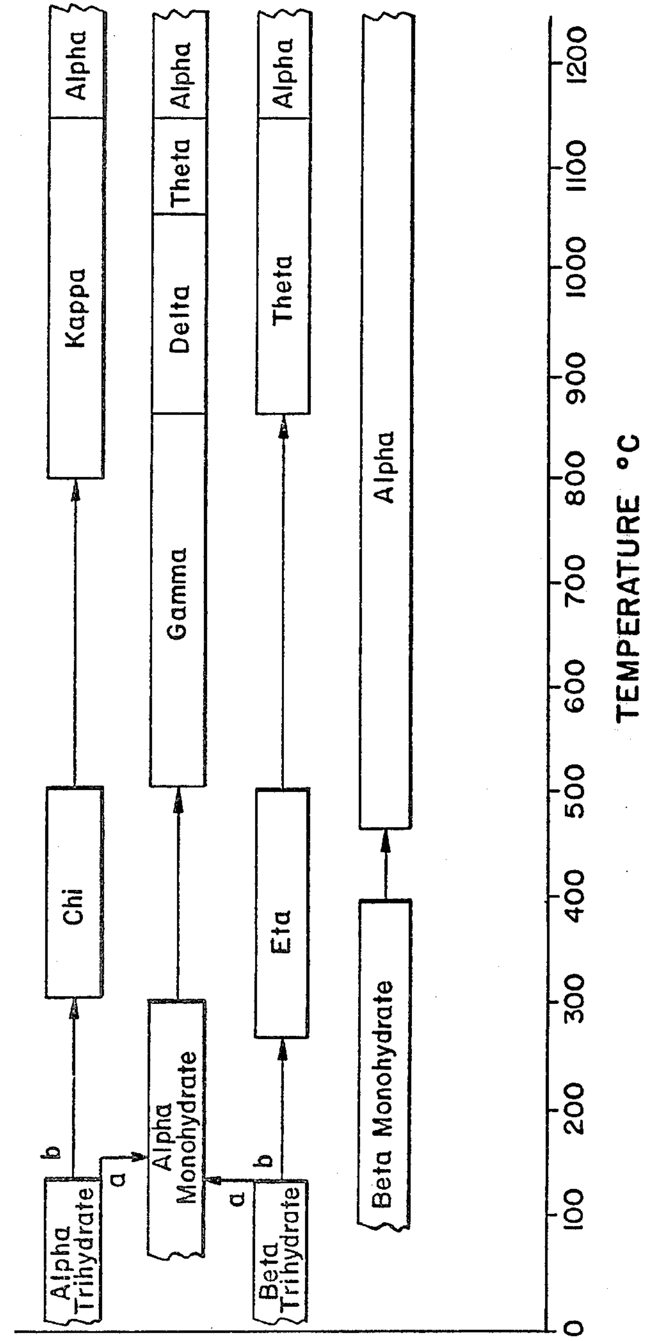
FIG. 2 is an alumina phase transformation diagram.

When utilizing a beta trihydrate as an initial alumina, the theta phase is broader, its limits being about 860° to about 1150° C. It should be noted that both beta trihydrate and alpha trihydrate aluminas may also be transformed into the alpha monohydrate form. Thus, either the alpha monohydrate or the beta trihydrate aluminas are suitably calcined to a temperature of about 1700°-2000° F. for the purpose of this invention. The alumina phase diagram is presented in FIG. 2.

EXAMPLES 1-4

Comparative runs were conducted using fresh (less than five days on stream) SMO-8410 and SMO-9141 catalysts. The characteristics of these catalysts are shown in Table 1 and their pore size distributions are shown in FIG. 1. An atmospheric residual oil from Light Arabian crude containing about 3% sulfur and about 33 ppm of vanadium and nickel was the charge. Other operating conditions and results are shown in Table II below. Included in Table II are catalyst performances for heteroatom removal of CCR (Conradson Carbon Residue) reduction corrected to 0.5 LHSV. The modified catalyst of Examples 3 and 4 (SMO-9141, a catalyst of this invention) was consistently higher in both desulfurization and demetalation. A comparison of the 5-day aged catalyst properties indicates that SMO-9141 maintained a slightly higher pore volume and surface area.

TABLE II

Fresh Activity for SMO-8410 and SMO-9141
Charge: Arab Lt Atmospheric Resid

| Example | | 1 | 2 | | 3 | 4 |
|---|---|---|---|---|---|---|
| Catalyst (SMO-) | — | 8410 | 8410 | — | 9141 | 9141 |
| Balance Conditions | | | | | | |
| Temperature, °F. | — | 672 | 720 | — | 674 | 723 |
| Pressure, psig | — | 2000 | 2000 | — | 2000 | 2000 |
| LHSV, CC CHG/CC CAT-HR | — | 0.52 | 0.54 | — | 0.49 | 0.49 |
| Days on Stream | — | 3.4 | 4.4 | — | 3.5 | 4.5 |
| H2 Circulation SCF/B | — | 6410 | 6316 | — | 6214 | 6310 |
| Yields | | | | | | |
| C5+, Wt. Pct | 100.00 | 98.56 | 97.92 | 100.00 | 98.78 | 98.04 |
| 1000° F.+, Vol Pct | 32.14 | 28.91 | 26.53 | 33.97 | 29.33 | 24.94 |
| H2 Consumption, SCF/B | — | 412 | 661 | — | 549 | 644 |
| TLP Properties | | | | | | |
| H, Wt Pct | 11.72 | 12.40 | 12.71 | 11.63 | 12.53 | 12.67 |
| Gravity, °API | 19.6 | 23.6 | 25.4 | 19.2 | 23.4 | 25.3 |
| S, Wt Pct | 2.91 | 1.16 | 0.60 | 2.79 | 0.85 | 0.47 |
| N, Wt Pct | 0.15 | 0.14 | 0.11 | 0.15 | 0.15 | 0.17 |
| CCR, Wt Pct | 6.48 | 4.61 | 2.96 | 7.17 | 4.05 | 3.05 |
| V, PPM | 27.0 | 2.4 | 0.5 | 28.9 | 2.3 | 0.1 |
| Ni, PPM | 5.4 | 1.9 | 0.8 | 4.4 | 1.2 | 0.4 |
| Catalyst Performance Corrected to 0.5 LHSV | | | | | | |
| Pct Demetalation | — | 87.5 | 96.6 | — | 89.3 | 98.5 |
| Pct Desulfurization | — | 61.3 | 80.6 | — | 69.7 | 83.4 |
| Pct Denitrogenation | — | 8.2 | 29.2 | — | 1.9 | — |
| Pct CCR Removal | — | 30.5 | 57.1 | — | 43.9 | 58.0 |
| Aged Catalyst Properties | | | | | | |
| Pore Volume, CC/G | — | — | 0.380 | — | — | 0.393 |
| Surface Area, Sq. M/G | — | — | 104 | — | — | 108 |
| Coke, G/100 G Fresh | — | — | 13.6 | — | — | 12.3 |
| V, G/100 G Fresh | — | — | 0.02 | — | — | 0.02 |
| Ni, G/100 G Fresh | — | — | 0.05 | — | — | 0.08 |

EXAMPLES 5-8

A similar set of experiments was carried out using a vacuum residual oil from Light Arabian crude containing about 4% sulfur 85 ppm metals (V+Ni). Results and operating conditions are summarized in Table III. Again, the modified catalyst of Examples 7-8 was more active for desulfurization and demetalation. The decreased coke deposition on SMO-9141 (14.5 wt. % on SMO-9141 vs. 16.9 wt. % on SMO-9141) is probably responsible for the improved activity of this catalyst.

TABLE III

Fresh Activity for Catalysts B and C
Charge: Arab Lt Vacuum Resid (75D2500 Series)

| Example | | 5 | 6 | 7 | 8 |
|---|---|---|---|---|---|
| Catalyst | — | B | B | C | C |
| Balance Conditions | | | | | |
| Temperature, °F. | — | 674 | 725 | 674 | 724 |
| Pressure, PSIG | — | 2000 | 2000 | 2000 | 2000 |
| LHSV, CC CHG/CC Cat-HR | — | 0.47 | 0.50 | 0.52 | 0.50 |
| Days on Stream | — | 4.0 | 5.0 | 4.0 | 5.0 |
| H2 Circulation, SCF/B | — | 5000 | 5000 | 3691 | 4473 |
| Yields | | | | | |
| C5+, Wt Pct | 100.00 | 98.85 | 98.01 | 98.28 | 97.08 |
| 1000° F.+, Vol Pct | 86.06 | 80.69 | 76.75 | 78.34 | 75.78 |
| H2 Consumption, SCF/B | — | 188 | 441 | 355 | 561 |
| TLP Properties | | | | | |
| H, Wt Pct | 10.62 | 10.90 | 11.28 | 11.20 | 11.49 |
| Gravity, °API | 8.3 | 11.2 | 12.1 | 12.3 | 14.3 |
| S, Wt Pct | 4.23 | 2.82 | 1.90 | 2.19 | 1.28 |
| N, Wt Pct | 0.28 | 0.27 | 0.25 | 0.27 | 0.25 |
| CCR, Wt Pct | 17.00 | 13.37 | 11.32 | 12.92 | 10.83 |
| V, PPM | 68.0 | 31.0 | 17.5 | 28.1 | 11.0 |
| Ni, PPM | 17.0 | 12.0 | 7.9 | 11.1 | 5.1 |
| Catalyst Performance Corrected to 0.5 LHSV | | | | | |
| Pct Demetalation | — | 49.0 | 70.6 | 55.5 | 81.5 |
| Pct Desulfurization | — | 33.6 | 56.0 | 49.7 | 70.5 |
| Pct Denitrogenation | — | 4.9 | 12.7 | 3.6 | 13.3 |
| Pct CCR Removal | — | 21.9 | 34.8 | 25.8 | 38.2 |
| Aged Catalyst Properties | | | | | |
| Pore Volume, CC/G | — | — | 0.442 | — | 0.406 |
| Surface Area, Sq. M/G | — | — | 110 | — | 104 |
| Coke, G/100 G Fresh | — | — | 16.9 | — | 14.5 |
| V, G/100 G Fresh | — | — | 0.40 | — | 0.36 |
| Ni, G/100 G Fresh | — | — | 0.04 | — | 0.10 |

EXAMPLES 9-16

A comparative evaluation of aged SMO-8410 and SMO-9141 catalysts using a vacuum residual oil from Light Arabian crude is shown in Tables IV and V. Prior to the runs shown, the subject catalysts were aged in a multi-catalyst basket reactor at 750° F., 2000 psig, 5000 standard cubic feet of hydrogen per barrel of charge, and 0.5 LHSV with the same charge stock. The modified catalyst of Examples 13-16, SMO-9141, retained its activity advantage over SMO-8410. Note that 20% less coke was formed on the modified catalyst while it effected greater reduction of the Conradson Carbon Residue of the charge. Although the higher activity catalyst is more efficient at removing heteroatoms from the asphaltenes (pentane-soluble material), there was little difference in activity for the conversion of asphaltenes. Another important improvement in the activity observed for the modified catalyst is a 5% advantage in molecular weight reduction. This reduction can aid in any downstream catalytic process in which the reaction is diffusion limited including second-stage hydrotreating. Again, decreased coke deposition was observed in the modified catalyst. This may be attributable to the decreased macropore (500 A+ diameter) volume of the SMO-9141 catalysts and consequent greater diffusional restriction exhibited thereby.

TABLE IV

Activity for Aged (20 Days; 750° F.; 0.5 LHSV) SMO-8410 and SMO-9141
Charge: Arab Lt Vacuum Resid

| Example | | 9 | 10 | 11 | 12 |
|---|---|---|---|---|---|
| Catalyst (SMO-) | — | 8410 | 8410 | 8410 | 8410 |
| Balance Conditions | | | | | |
| Temperature, °F. | — | 673 | 722 | 725 | 774 |
| Pressure, PSIG | — | 2000 | 2000 | 2000 | 2000 |
| LHSV, CC CHG/CC CAT-HR | — | 0.38 | 0.47 | 0.50 | 0.58 |
| Days on Stream | — | 1.3 | 1.9 | 2.3 | 3.5 |
| H2 Circulation, SCF/B | — | 6669 | 4133 | 5737 | 4753 |
| Yields | | | | | |
| C5+, Wt Pct | 100.00 | 99.15 | 98.32 | 97.79 | 96.31 |
| 1000° F.+, VOL PCT | 86.06 | 81.27 | 75.69 | 77.97 | 62.01 |
| H2 Consumption, SCF/B | — | 229 | 186 | 217 | 467 |
| TLP Properties | | | | | |
| H, Wt Pct | 10.62 | 10.94 | 10.89 | 10.90 | 11.17 |
| Gravity, °API | 8.3 | 11.3 | 10.0 | 12.2 | 15.8 |
| S, Wt Pct | 4.23 | 3.07 | 2.79 | 2.59 | 1.95 |
| N, Wt Pct | 0.28 | 0.28 | 0.27 | 0.25 | 0.24 |
| CCR, Wt Pct | 17.00 | 12.66 | 13.77 | 13.54 | 11.50 |
| V, PPM | 68.0 | 35.0 | 29.0 | 23.0 | 9.2 |
| Ni, PPM | 17.0 | 12.0 | 11.0 | 9.9 | 6.1 |
| Mol. Wt. | 813 | 724 | 702 | 730 | 585 |
| Asphaltenes, Wt Pct | 15.65 | 8.89 | — | 8.04 | 6.71 |
| Catalyst Performance Corrected To 0.5 LHSV | | | | | |
| Pct Demetalation | — | 39.6 | 52.2 | 62.3 | 85.5 |
| Pct Desulfurization | — | 24.6 | 34.2 | 40.2 | 58.1 |
| Pct Denitrogenation | — | — | 5.0 | 12.7 | 19.0 |
| Pct CCR Removal | — | 22.4 | 19.6 | 22.7 | 37.9 |
| Mol. Wt. | 818 | 747 | 709 | 730 | 548 |
| Pct Asph. Conversion | — | 38.2 | — | 49.9 | 62.5 |
| Aged Catalyst Properties | | | | | |
| Pore Volume, CC/G | — | — | — | — | 0.381 |
| Surface Area, Sq. M/G | — | — | — | — | 99 |
| Coke, G/100 G Fresh | — | — | — | — | 15.7 |
| V, G/100 G Fresh | — | — | — | — | 2.37 |
| Ni, G/100 G Fresh | — | — | — | — | 0.42 |

TABLE V

Activity for Aged (20 Days; 750° F.; 0.5 LHSV) SMO-8410 and SMO-9141
Charge: Arab Lt Vacuum Resid

| Example | | 13 | 14 | 15 | 16 |
|---|---|---|---|---|---|
| Catalyst (SMO-) | — | 9141 | 9141 | 9141 | 9141 |
| Balance Conditions | | | | | |
| Temperature, °F. | — | 675 | 725 | 726 | 774 |
| Pressure, PSIG | — | 2000 | 2000 | 2000 | 2000 |
| LHSV, CC CHG/CC CAT-HR | — | 0.49 | 0.43 | 0.44 | 0.45 |
| Days on Stream | — | 1.1 | 1.6 | 2.1 | 3.1 |
| H2 Circulation, SCF/B | — | 5355 | 6143 | 5730 | 5475 |
| Yields | | | | | |
| C5+, Wt Pct | 100.00 | 98.90 | 97.65 | 97.96 | 95.79 |
| 1000° F.+, Vol Pct | 86.06 | 80.11 | 76.67 | 75.96 | 56.34 |
| H2 Consumption, SCF/B | — | 427 | 294 | 435 | 690 |
| TLP Properties | | | | | |
| H, Wt Pct | 10.62 | 11.23 | 11.06 | 11.24 | 11.49 |
| Gravity, °API | 8.3 | 12.1 | 13.3 | 13.1 | 17.0 |
| S, Wt Pct | 4.23 | 2.85 | 2.16 | 2.29 | 1.39 |
| N, Wt Pct | 0.28 | 0.27 | 0.26 | 0.26 | 0.23 |
| CCR, Wt Pct | 17.00 | 13.22 | 12.18 | 12.64 | 10.16 |
| V, PPM | 68.0 | 37.0 | 15.0 | 18.0 | 3.8 |
| Ni, PPM | 17.0 | 12.0 | 7.9 | 8.3 | 4.0 |
| Mol. Wt. | 813 | 723 | 649 | 647 | 497 |
| Asphaltenes, Wt Pct | 15.65 | 9.05 | — | 8.32 | 6.18 |
| Catalyst Performance Corrected to 0.5 LHSV | | | | | |
| Pct Demetalation | — | 42.4 | 70.0 | 66.4 | 89.8 |
| Pct Desulfurization | — | 32.9 | 47.5 | 44.7 | 67.0 |
| Pct Denitrogenation | — | 4.5 | 8.5 | 8.3 | 20.2 |
| Pct CCR Removal | — | 22.7 | 27.5 | 25.1 | 40.6 |
| Mol. Wt. | — | 725 | 673 | 668 | 529 |

TABLE V-continued

Activity for Aged (20 Days; 750° F.; 0.5 LHSV) SMO-8410 and SMO-9141
Charge: Arab Lt Vacuum Resid

| Example | | 13 | 14 | 15 | 16 |
|---|---|---|---|---|---|
| Catalyst (SMO-) | — | 9141 | 9141 | 9141 | 9141 |
| Pct Asph. Conversion | — | 42.2 | — | 44.9 | 60.3 |
| Aged Catalyst Properties | | | | | |
| Pore Volume, CC/G | — | — | — | — | 0.359 |
| Surface Area, Sq. M/G | — | — | — | — | 97 |
| Coke, G/100 G Fresh | — | — | — | — | 12.3 |
| V, G/100 G Fresh | — | — | — | — | 2.42 |
| Ni, G/100 G Fresh | — | — | — | — | 0.43 |

EXAMPLE 17

A preparation procedure for the demetalation-desulfurization class of catalysts of this invention may be defined as follows:

About 7000 grams of Catapal SB commercial alumina powder were mixed-mulled with about 4300 ml water and auger extruded to 1/32 inch diameter cyclinders. These were dried at 250° F., calcined in flowing air 10 hours at 1000° F. and then in stagnant atmosphere for 4 hours at 1700° F. to transform the alumina to the desired characteristics.

About 700 grams of the calcined extrudate were impregnated to incipient wetness with 427 ml of a solution containing 98.1 gms ammonium heptamolybdate (81.5%/$MoO_3$); and dried overnight in an oven at 250° F.

The dried material was impregnated to incipient wetness with 281 ml of a solution containing 110.0 grams of cobaltous nitrate hexahydrate and dried at 250° F. overnight. Finally, the cobalt-molybdenum impregnated alumina was calcined to about 1000° F. at a gradually increasing temperature of about 5° F./min. and held at 1000° F. for about 6 hours.

In summary of the preferred embodiments, this invention provides a hydrodemetalation-desulfurization catalyst comprising a hydrogenating component selected from the group of oxides or sulfides of at least one Group VIB or Group VII metal composited with an alumina base which comprises theta or delta phase alumina and which composite has a surface area of 40–150 $m^2/g$, a pore volume of 0.45–1.50 cc/g, and has not less than about 60% of its pore volume in pores with diameters of about 100 A to about 200 A; with an improvement which comprises providing a composite having about 40 to 75% of its pore volume in pores with diameters of about 150 A to about 200 A and up to about 5% of its pore volume in pores with diameters greater than about 500 A.

In another embodiment, the catalyst composite has from 1 to 5% of its pore volume in pores with diameters greater than about 500 A.

In another embodiment, the catalyst hydrogenating component consists essentially of about 2 to about 10 wt. % cobalt and about 5 to about 20 wt. % molybdenum.

In another embodiment, the catalyst alumina base is produced by calcining an alpha monohydrate to a temperature of about 1600–2000° F.

In a further embodiment, the catalyst composite has a surface area within the range of about 90 to 130 $m^2/g$ and a pore volume within the range of about 0.45 to 0.65 cc/g.

What is claimed is:

1. In a process for catalytically demetalizing and desulfurizing a residual oil by contacting said oil with hydrogen under hydrotreating conditions in the presence of a catalyst comprising a hydrogenating component selected from the group of oxides or sulfides of at least one Group VIB or Group VIII metal composited with an alumina base which comprises theta or delta phase alumina and which composite has a surface area of 40–150 $m^2/g$, a pore volume of 0.45–1.50 cc/g, and has not less than about 60% of its pore volume in pores with diameters of about 100 A to about 200 A; the improvement which comprises using as said catalyst one which is a composite having about 40 to 75% of its pore volume in pores with diameters of about 150 A to about 200 A and up to about 5% of its pore volume in pores with diameters greater than about 500 A.

2. The processes of claim 1 wherein said contact is carried out at a hydrogen pressure of about 500 to 3000 psig, a temperature of about 600° to about 850° F. and a space velocity of about 0.1 to 5 LHSV.

3. The processes of claim 1 wherein the mixture of hydrogen and hydrocarbons recovered from said contact is passed through a second bed of a second catalyst disposed downstream of the first catalyst, said second catalyst comprising the oxides or sulfides of a Group VI B metal and a Group VIII metal on an alumina support, said second catalyst having a surface area of at least 150 $m^2/g$ and at least 50 percent of its pore volume is in pores with diameters of 30 to 100 A.

4. The processes of claim 3 wherein said first catalyst occupies 40% to 80% of the total catalyst volume of the two beds.

5. The processes of claim 4 wherein the mixture of hydrogen and hydrocarbons recovered from said second bed containing said second catalyst is passed through a third zone containing a relatively smaller bed of said first catalyst and disposed downstream of said second catalyst.

6. The process of claim 1 wherein the catalyst hydrogenating component consists essentially of about 2 to about 10 wt. % cobalt and about 5 to about 20 wt. % molybdenum.

* * * * *